(12) United States Patent  
Stockmaster

(10) Patent No.: US 7,873,095 B1  
(45) Date of Patent: Jan. 18, 2011

(54) COORDINATED FREQUENCY HOP JAMMING AND GPS ANTI-JAM RECEIVER

(75) Inventor: Michael H. Stockmaster, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1148 days.

(21) Appl. No.: 11/528,784

(22) Filed: Sep. 27, 2006

(51) Int. Cl.
*H04B 1/00* (2006.01)
*H03D 1/04* (2006.01)

(52) U.S. Cl. ..................... 375/132; 375/346
(58) Field of Classification Search .......... 375/130, 375/132, 136, 316, 346, 350; 701/200, 204, 701/213; 455/1, 130, 296; 398/39; 342/13, 342/14, 16
See application file for complete search history.

(56) References Cited

U.S. PATENT DOCUMENTS 6,115,409 A * 9/2000 Upadhyay et al. ........... 375/144
6,931,292 B1 * 8/2005 Brumitt et al. ................ 700/94
7,239,843 B2 * 7/2007 Jung .............................. 455/1
2003/0007553 A1 * 1/2003 Fifield ......................... 375/232

\* cited by examiner

*Primary Examiner*—David C Payne
*Assistant Examiner*—Vineeta S Panwalkar
(74) *Attorney, Agent, or Firm*—Matthew J. Evans; Daniel M. Barbieri

(57) ABSTRACT

An anti-jam receiver for coordinating with a frequency hop jammer includes a receiver assembly for receiving a spread spectrum signal, and a processor for removing an undesired signal from the spread spectrum signal. The processor utilizes an anti-jam algorithm in the frequency domain. The processor has an update interval during which frequencies that have been identified with undesired signals are removed from the spread spectrum signal. The frequency hop jammer has a hop interval during which a jamming signal is transmitted at a constant frequency. By coordinating the update interval of the processor with the hop interval of the frequency hop jammer, the frequency hop jammer appears to be a continuous wave jammer to the anti-jam receiver, while appearing to be a broadband jammer to other anti-jam systems that are not coordinated with the hop interval of the frequency hop jammer.

5 Claims, 2 Drawing Sheets

COORDINATED FREQUENCY HOP JAMMING AND GPS ANTI-JAM RECEIVER

FIELD OF THE INVENTION

The present invention generally relates to the field of spread spectrum processing, and more particularly to a system and method for coordinated frequency hop jamming, such as jamming of spread spectrum positioning signals in a mixed blue and red force jamming environment, or the like.

BACKGROUND OF THE INVENTION

The Global Positioning System (GPS) is part of a satellite-based navigation system developed by the United States Defense Department. A fully operational GPS includes up to 24 satellites in non-geosynchronous orbit, each transmitting spread spectrum, L-band carrier signals on both the L1 (1575.42 MHz) and L2 (1227.6 MHz) carrier frequencies. The Galileo System is a satellite-based navigation system initiated by the European Union. The Open Service (OS) is one of a number of combined services provided by Galileo. Open Galileo is defined for mass-market applications and offers up to three separate signal frequencies.

Precise code (P-code) is a portion of the GPS signal that is typically utilized by the United States military. P-code has a 10.23 MHz bit rate and a period of precisely one week. P-code is encrypted (encrypted P-code is referred to as Y-code) and reset every seven days to prevent unauthorized use. Clear/Acquisition code (C/A-code) is a portion of the GPS signal located in the center of the GPS band that is available for civilian and commercial use. C/A-code has a 1.023 MHz bit rate and a period of one millisecond. Each GPS satellite broadcasts unique C/A-code to distinguish itself from all other GPS satellites. The open Galileo signal structure is also located in the center of the band with a Binary Offset Carrier (BOC) BOC(1, 1) signal structure. Military code (M-code) is a portion of the GPS signal that is modernized and designed to protect utilization of GPS by the United States military and its allies. The M-code signal structure was designed with the intent to jam the center of the GPS band (known as prevent or blue force jamming) to deny enemy C/A-code receivers the ability to track. While the M-code signal was designed with inherent jamming protection, the C/A-code, P(Y)-code, and open Galileo signals were not.

One technique for dealing with blue force jamming, which is typically up to about 2-3 MHz wide, is to include a notch filter in the signal processing chain. However, this may prevent C/A-code from being tracked by friendly forces and cause severe distortion to the P(Y)-code correlation function. Anti-Jam (AJ) processing including spatial nulling, space-time adaptive processing (STAP), and space-frequency adaptive processing (SFAP) may be incorporated. However, the degrees of freedom of the anti-jam system may be reduced by blue force jamming, especially when multiple blue force jammers are utilized in a given area. When the degrees of freedom are used up, the STAP and SFAP techniques are forced to notch the signal at the center of the band, having the same negative effect on the C/A-code and P(Y)-code signals. Moreover, spatial nulling is ineffective under these conditions.

Thus, it would be desirable to jam the C/A-code and open Galileo signals to prevent enemy use while still allowing friendly receivers to track these signals and minimizing distortion to P(Y)-code signals.

SUMMARY OF THE INVENTION

Accordingly, the present invention is directed to an Anti-Jam (AJ) receiver for coordinating with a frequency hop prevent jammer. The anti-jam receiver includes a receiver assembly for receiving a spread spectrum signal, and a processor for removing one or more undesired signals from the spread spectrum signal. The processor is connected to the receiver assembly for processing the spread spectrum signal utilizing an anti-jam algorithm, which operates in the frequency domain. The processor has an update interval during which frequencies and/or frequency bands that have been identified with undesired signals are removed from the spread spectrum signal.

The frequency hop jammer transmits a jamming signal for interfering with reception of the spread spectrum signal. The frequency hop jammer has a hop interval during which the jamming signal is transmitted at a constant frequency. By coordinating the update interval of the processor with the hop interval of the frequency hop jammer, the frequency hop jammer appears to be a Continuous Wave (CW) jammer to the anti-jam receiver (in the case of a CW jamming signal), while appearing to be a Broadband (BB) jammer to other anti-jam systems that are not coordinated with the hop interval of the frequency hop jammer.

Thus, the present invention allows for the transmission of blue force jamming that has the effect of CW jamming on friendly systems, while appearing as broadband to enemy systems. Further, in an M-Code context, the present invention allows the tracking of C/A code and significantly improved tracking of P(Y) code in a YMCA receiver in the presence of a prevent jammer without reducing the degrees of freedom of the AJ processing. A YMCA receiver may refer to a receiver which may track Y, M and CA code. In this mode of coordinated jamming, only blue force receivers equipped with this AJ feature may perform optimally.

It is to be understood that both the foregoing general description and the following detailed description are exemplary and explanatory only and are not necessarily restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
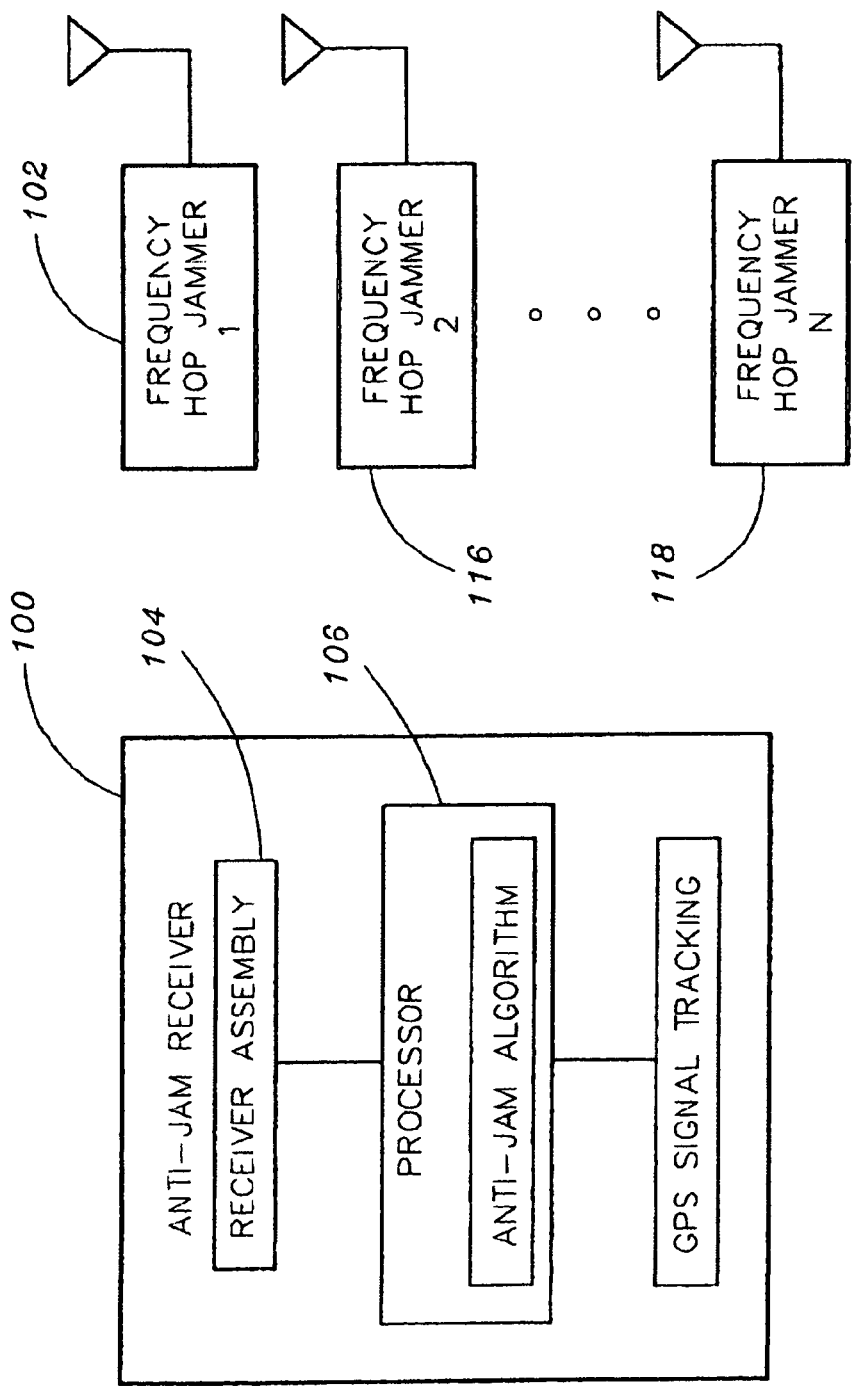
FIG. 1 is a block diagram illustrating an anti-jam receiver and a number of frequency hop jammers in accordance with an exemplary embodiment of the present invention, wherein the anti-jam receiver coordinates the update interval of its processor with the hop interval of the frequency hop jammers.
Figure 2:
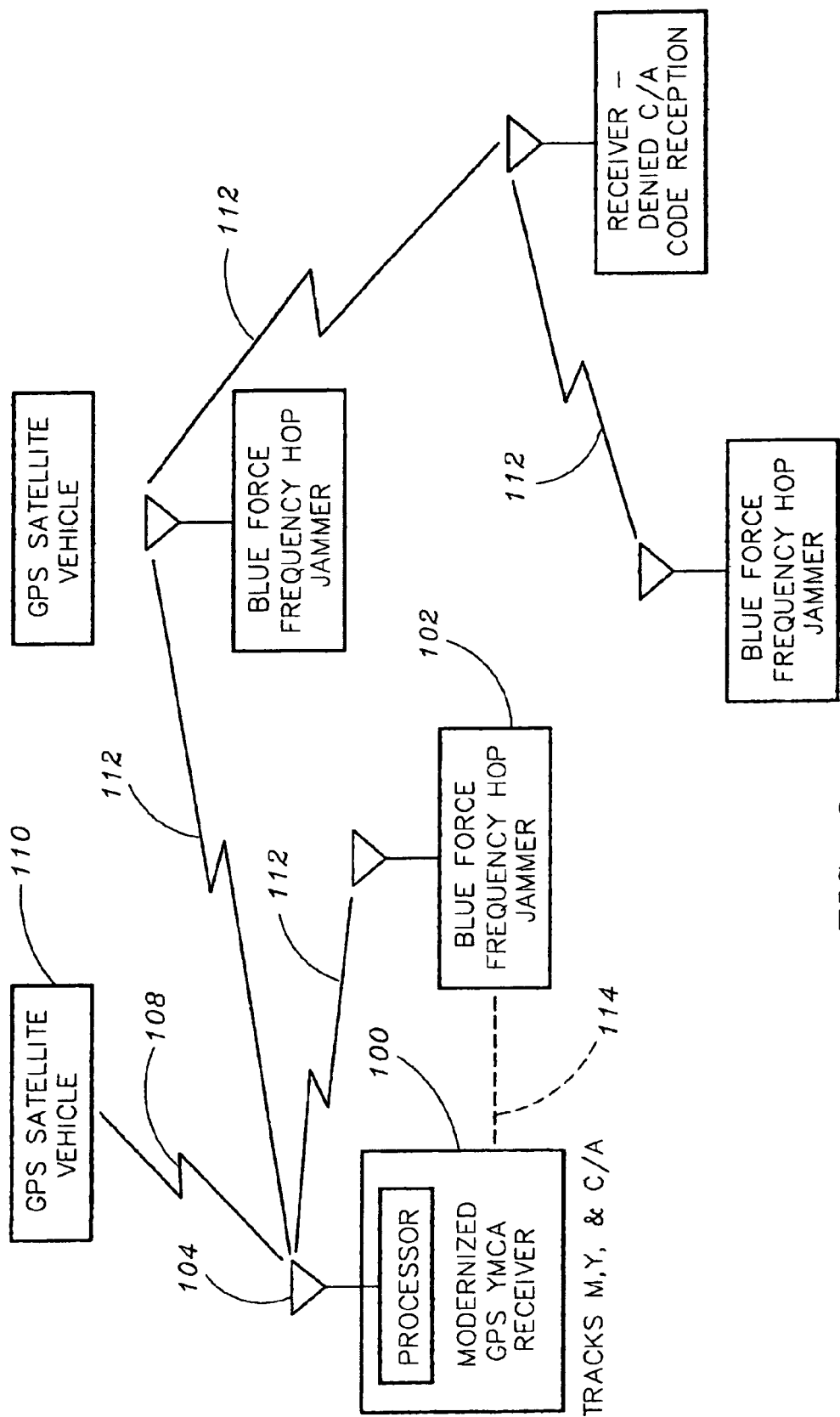
FIG. 2 is a block diagram illustrating an anti-jam receiver in a blue force jamming environment in accordance with an exemplary embodiment of the present invention, wherein the anti-jam receiver receives a spread spectrum signal from a GPS satellite vehicle and removes a jamming signal transmitted by a blue force frequency hop jammer.

Referring generally to FIGS. 1 and 2, an Anti-Jam (AJ) receiver 100 for coordinating with a frequency hop jammer 102 is described in accordance with exemplary embodiments of the present invention. The anti-jam receiver 100 includes a receiver assembly 104 for receiving a spread spectrum signal, and a processor 106 for removing one or more undesired signals from the spread spectrum signal. The processor 106 is connected to the receiver assembly 104 for processing the spread spectrum signal utilizing an anti-jam algorithm, which works in the frequency domain. The processor 106 has an update interval during which frequencies and/or frequency bands that have been identified with undesired signals are removed from the spread spectrum signal.

The frequency hop jammer 102 transmits a jamming signal for interfering with reception of the spread spectrum signal. The jamming signal is transmitted at a frequency within the frequency bandwidth of the spread spectrum signal, and has a small spectrum bandwidth in relation to the spread spectrum signal. The frequency hop jammer 102 has a hop interval during which the jamming signal is transmitted at a constant frequency (alternatively, the jamming signal is transmitted within a small-spectrum frequency band centered about a constant frequency during the hop interval). It is contemplated that hop interval may refer to any type of change between a first frequency band at a first point in time followed by a second frequency band at a second point in time. By coordinating the update interval of the processor 106 with the hop interval of the frequency hop jammer 102, the frequency hop jammer 102 appears to be a Continuous Wave (CW) jammer to the anti-jam receiver 100 (in the case of a CW jamming signal), while appearing to be a Broadband (BB) jammer to other anti-jam systems that are not coordinated with the hop interval of the frequency hop jammer 102.

In one specific embodiment, the anti-jam receiver 100 comprises a digital AJ system for receiving spread spectrum positioning signals and removing one or more undesired signals therefrom. For example, the anti-jam receiver 100 includes a receiver assembly 104 for receiving a spread spectrum signal in the form of electromagnetic waves, or another type of receiver assembly for receiving the spread spectrum signal. The receiver assembly 104 may be utilized for receiving a spread spectrum positioning signal 108 from a Global Positioning System (GPS) satellite vehicle 110, an Open Service (OS) signal from a Galileo satellite vehicle, or another spread spectrum signal as desired. When the spread spectrum signal 108 includes an undesired signal, such as a CW jamming signal from a blue force jammer, a BB jamming signal from a red force jammer, or the like, the anti-jam receiver 100 removes the undesired signal from the spread spectrum signal 108.

To identify undesired signals, the processor 106 partitions the spread spectrum signal 108 into discrete groups (bins) of frequency bands, and then analyzes the bins to identify frequencies that include energy above the level of the spread spectrum signal (e.g., energy above the level of ambient noise in the case of a low-power spread spectrum signal, such as the spread spectrum positioning signal 108). The anti-jam algorithm assumes that frequencies identified in this manner include jamming signals, based on the idea that a jammer is closer to the anti-jam receiver 100 than the satellite vehicle 110, and is capable of transmitting a stronger signal. The processor 106 has a well defined update interval during which the anti-jam algorithm removes frequencies identified with undesired signals from the spread spectrum signal 108. For instance, the processor 106 removes an undesired signal transmitted at a first frequency during a first update interval, a second frequency during a second update interval, and a third frequency during a third update interval.

A blue force frequency hop jammer 102 transmits a CW jamming signal 112 for interfering with reception of the spread spectrum signal 108. The frequency of the CW jamming signal 112 varies according to the hop interval of the frequency hop jammer 102. For example, the frequency hop jammer 102 transmits the CW jamming signal 112 at a first frequency during a first hop interval, a second frequency during a second hop interval, and a third frequency during a third hop interval. In one specific embodiment, the update interval (UI) of the processor 106 is coordinated with the hop interval (HI) of the frequency hop jammer 102, such that the update interval is equal to the first hop interval, the second hop interval, and the third hop interval (i.e., UI=HI). In another specific embodiment, the update interval is coordinated with the hop interval, such that the hop interval is a multiple of the update interval (i.e., HI=M*UI, where M is a positive integer). By coordinating the update interval with the hop interval in these synchronous embodiments, the anti-jam receiver 100 is able to remove the CW jamming signal 112 from the spread spectrum signal 108 during the first hop interval, the second hop interval, and the third hop interval. For example, the update interval of the processor 106 and the hop interval of the frequency hop jammer 102 may be derived from the same clock, or, alternatively, may be coordinated utilizing an external synch method (e.g., a datalink). In this manner, the CW jamming signal 112 looks CW to the anti-jam processing, because the beginning of each update interval corresponds to the beginning of a hop interval.

In a further specific embodiment, the update interval (UI) of the processor 106 is coordinated with the hop interval (HI) of the frequency hop jammer 102, such that the update interval is less than or at least substantially equal to the hop interval (i.e., UI≦HI). By coordinating the update interval with the hop interval in this asynchronous embodiment, the CW jamming signal 112 looks at most like two CW jamming signals in any particular update interval. For example, the frequency hop jammer 102 transmits the CW jamming signal 112 at a first frequency during a first hop interval and a second frequency during a second hop interval. During one particular update interval, the CW jamming signal 112 is transmitted at the first frequency for a first portion of the update interval, and the second frequency for a second portion of the update interval. Accordingly, the anti-jam receiver 100 is able to remove the first frequency from the spread spectrum signal 108 during the first update interval. Correspondingly, the anti-jam receiver 100 is able to remove the second frequency from the spread spectrum signal 108 during the next update interval immediately following the first update interval. It will be appreciated that the performance of the AJ receiver 100 will improve as the ratio of the update interval to the hop interval (i.e., UI/HI) decreases, because the number of update intervals appearing to have two CW jamming signals will decrease, and hence performance will increase.

While the CW jamming signal 112 has been described with some specificity, it will be appreciated that other jamming signals having a small spectrum bandwidth in relation to the spread spectrum signal 108 may be transmitted by the frequency hop jammer 102 and removed by the anti-jam receiver 100 without departing from the scope and intent of the present invention (e.g., pulsed jamming signals, narrowband jamming signals, and the like).

The anti-jam receiver 100 may include an optional link 114 for communicating with the frequency hop jammer 102 and coordinating the update interval of the processor 106 with the hop interval of the CW jamming signal 112.

For instance, in one specific embodiment, the frequency hop jammer 102 transmits its hop interval to the anti-jam receiver 100, and the anti-jam receiver 100 coordinates its update interval as necessary. The frequency hop jammer 102 may encode or otherwise mask the hop interval from enemy reception. In another specific embodiment, the frequency hop jammer 102 transmits its hop interval to a second frequency hop jammer 116 (up to an Nth frequency hop jammer 118) for coordinating the update intervals of the various frequency hop jammers. In an alternative embodiment, the anti-jam receiver 100 transmits its hop interval to the frequency hop jammer 102, and the frequency hop jammer 102 coordinates its hop interval as necessary. It will be appreciated that the anti-jam receiver 100 and the frequency hop jammer 102 may coordinate the update interval of the processor 106 and the hop interval of the CW jamming signal 112 in a variety of ways without departing from the scope and intent of the present invention. Further, it should be noted that the anti-jam receiver 100 may coordinate its update interval with a number of different frequency hop jammers, and may also include one or more processors capable of processing the spread spectrum signal 108 at varying update intervals for removing jamming signals transmitted at different hop intervals.

By coordinating the update interval of the anti-jam receiver 100 with the hop interval of the frequency hop jammer 102, such that the hop duration of the frequency hop jammer 102 corresponds to the update interval, and by providing an anti-jam algorithm that works in the frequency domain, the impact of the CW jamming signal 112 transmitted by the frequency hop jammer 102 may be minimized to a specific frequency and/or frequency/spatial combination. Thus, raw anti-jam improvement is increased, and distortion of the C/A and P(Y) code signals is reduced. For instance, in one specific embodiment, the processor 106 utilizes an anti-jam algorithm to remove the CW jamming signal 112 from the spread spectrum signal 108. In another embodiment, the processor 106 utilizes an anti-jam algorithm incorporating Space-Time Adaptive Processing (STAP) in the frequency domain to remove the CW jamming signal 112 from the spread spectrum signal 108. In a still further embodiment, the processor 106 utilizes an anti-jam algorithm incorporating Space-Frequency Adaptive Processing (SFAP) to remove the CW jamming signal 112 from the spread spectrum signal 108. It should be noted that other anti-jam algorithms that work in the frequency domain may be utilized as well, without departing from the scope and spirit of the present invention.

During one specific set of conditions, the anti-jam receiver 100 removes the CW jamming signal 112 from the spread spectrum signal 108 by placing a null in the direction of the frequency hop jammer 102 transmitting the CW jamming signal 112. During another specific set of conditions, the anti-jam receiver 100 removes the CW jamming signal 112 by excising the frequency of the CW jamming signal 112 from the spread spectrum signal 108. For example, in one specific embodiment, the receiver assembly 104 includes a controlled reception pattern antenna having four separate antenna elements for receiving the spread spectrum signal 108. Three elements, including a first antenna element, a second antenna element, and a third antenna element, are arranged in an array around a fourth central reference element. In this configuration, the processor 106 is included with an electronics box connected to the receiver assembly 104. The processor 106 receives the spread spectrum signal 108 from the four antenna elements, and utilizes the anti-jam algorithm to remove the CW jamming signal 112 (and possibly other jamming signals) from the spread spectrum signal 108.

Each one of the four antenna elements provides the processor 106 with a separate output. Alternatively, in the case of STAP and SFAP, each output may be delayed utilizing a series of tapped delay lines, or the like, providing multiple outputs from each antenna element, which are delayed in time and/or frequency. The processor 106 combines the separate outputs from the four antenna elements into a single output, controlling the phase and gain (complex weights) of the separate outputs and producing an adaptive gain pattern. The processor 106 can adjust the adaptive gain pattern to remove undesired signals from the spread spectrum signal 108 by placing a spatial null in the direction of an undesired signal source. For instance, the processor 106 computes a complex weight for one of the outputs to remove the CW jamming signal 112 transmitted by the blue force frequency hop jammer 102, placing a spatial null in the direction of the frequency hop jammer 102. The processor 106 may also compute complex weights to remove jamming signals transmitted by other blue force jammers, red force jammers, and the like.

The anti-jam receiver 100 has a number of degrees of freedom determined by the number of antenna elements and the number of outputs from each antenna element. For example, the controlled reception pattern antenna with four separate antenna elements has three spatial degrees of freedom. Alternatively, in the case of STAP and SFAP, degrees of freedom in the frequency domain may be present, according to the number of taps or bins on each antenna element. When the degrees of freedom of the anti-jam receiver 100 are not exceeded by a number of red force jammers, the CW jamming signal 112 is removed from the spread spectrum signal 108 by computing a complex weight for one of the outputs, placing a spatial null in the direction of the frequency hop jammer 102. However, when the degrees of freedom are exceeded by the number of red force jammers, the CW jamming signal 112 is removed from the spread spectrum signal 108 by excising the frequency of the CW jamming signal 112 from the spread spectrum signal 108.

When the degrees of freedom of the anti-jam receiver 100 are not exceeded (e.g., four elements, two broadband noise jammers, and the prevent jammer), the potential for signal distortion due to the antenna pattern geometry related to the presence of the blue force frequency hop jammer 102 is significantly reduced by the present invention. During any given weight update interval, the antenna pattern has a spatial null in the direction of the blue force frequency hop jammer 102, but only at the frequency of the hop. Most of the signal bandwidth is left undistorted. For example, for a complex sampling rate of 30 MHz to cover the M-Code bandwidth with a 256 bin SFAP system, there are 17 bins in the 2 MHz C/A code null-to-null bandwidth. Only one bin plus the adjacent bins (Fast Fourier Transform (FFT) leakage, window dependent) or about 20% of the signal bandwidth has the potential for distortion. For P(Y) code, the effect is significantly less due to its larger inherent bandwidth.

For the case where the degrees of freedom are exceeded by enemy broadband (red force) jammers, and a blue force jammer still exists, the frequency of the hop will be excised. In this case, distortion due to excision is always present due to the large number of jammers, but the invention limits the distortion to approximately 20% of the band in the example given. This is true for any frequency hop location within the frequency range of the spread spectrum signal 108.

The above descriptions assumed that the jamming would be limited to a region in the center of the band; however, the benefits still exist if the jammer were spread over the entire GPS bandwidth.

The CW jamming signal 112 transmitted by the frequency hop jammer 102 either appears broadband to or consumes a degree of freedom for standard GPS receivers, analog AJ systems (e.g., GPS Antenna System 1 (GAS-1)), digital spatial nullers, and even to other AJ systems employing STAP/SFAP that have a slow update rate relative to the anti-jam receiver 100. If this type of jamming were employed, the anti-jam receiver 100 would offer a performance advantage, as only a system coordinated to the jamming could offer the same amount of AJ protection.

The above description (four elements, two broadband noise jammers, and the prevent jammer) illustrates how the present invention works in the case of a single blue force frequency hop jammer 102. This scenario may be utilized when localized jamming is required. However, another scenario for jamming utilizing the present invention includes multiple blue force jammers.

In one specific embodiment, a number of blue force frequency hop jammers (e.g., the first frequency hop jammer 102, a second frequency hop jammer 116, up to an Nth frequency hop jammer 118) all hop at the same frequency at the same time. Even though the number of blue force jammers may completely overwhelm the number of degrees of freedom of a typical anti-jam system, STAP and SFAP can create a frequency notch to remove all the prevent jamming without requiring a spatial null for each prevent jammer. This would be true regardless of whether red force jamming was present or not. In this embodiment, the number of red force jammers can be as many as the spatial degrees of freedom of the anti-jam receiver. This specific configuration would have the least impact to overall AJ performance, as compared to another specific embodiment, in which a number of blue force frequency hop jammers all hop at different frequencies at the same time.

In another specific embodiment, a number of blue force frequency hop jammers (e.g., the first frequency hop jammer 102, the second frequency hop jammer 116, up to the Nth frequency hop jammer 118) all hop at different frequencies at the same time and spread across the band of interest for enemy denial. The number of blue force frequency hop jammers and the hop frequencies of the blue force frequency hop jammers can be chosen to minimize the impact to AJ performance. That is, one can pick the frequency separations such that the jammers can be removed spatially, increasing the number of red force broadband jammers that can simultaneously be removed without forcing the AJ algorithms to excise. By hopping the blue force jammers at different frequencies for each hop, one also may prevent the enemy from employing countermeasures, such as a frequency excisor that may be effective in some cases when all the blue force jammers are hopping together at the same frequency. With the hop frequencies spread across the band at a given instant, an excisor would have to excise the whole band and leave the signal untrackable for the enemy. The simple fact that many blue force frequency hop jammers are utilized may prevent the enemy from utilizing a simple nuller to defeat the prevent jamming. It is contemplated that only a high end digital STAP/SFAP system could potentially defeat this threat.

Consider a 256 bin SFAP system (as described above) with four elements in the context of a multiple blue force frequency hop jammer implementation with unique hop frequencies for the blue force jammers. To ensure minimal degradation of signal performance, the jammers must be spaced in frequency so that in any given bin the jammer plus (significant) leakage signals from adjacent jammers does not exceed three so that spatial nulls are constrained in frequency. Even in this case it should be possible to operate with essentially no degradation for 15+ jammers (assuming the jammer and leakage consumes approximately 20% of the band) and minimal degradation with 20+ jammers. For this example, one could roughly reduce the number of blue force jammers by five for each broadband red force jammer expected to be encountered. Given that most high-end AJ systems utilize seven elements, the SFAP system described could potentially remove three BB jammers in addition to approximately 15 blue force jammers, ensuring operation in a mixed blue and red force jamming environment. This form of the present invention addresses the issue of the enemy's ability to employ countermeasures (e.g., excisors/simple nullers) while maintaining the original goal of preserving red force AJ performance. In the absence of red force jamming for a seven element system, at least approximately 30 blue force jammers could be removed. Trades can be made at a system level to determine the complexity of the AJ processing in terms of the number of bins/taps and elements vs. the number of blue force jammers required and the expected number of red force jammers.

While the anti-jam receiver 100 has been described with some specificity as having a receiver assembly 104 including a controlled reception pattern antenna, it is contemplated that the anti-jam receiver 100 may have other antenna elements including other geometries, without departing from the spirit and intent of the present invention. For example, in another specific embodiment, the anti-jam receiver 100 includes a single antenna element utilized in combination with an adaptive narrowband filtering anti-jam processing algorithm, having an update interval coordinated with the hop interval of the blue force frequency hop jammer 102. It is further contemplated that other processing techniques may be utilized with the anti-jam receiver 100 as well, including beam steering, beam forming, and the like.

It is believed that the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for providing prevent jamming of a spread spectrum signal while allowing a friendly receiver coordinated with the prevent jamming to remove a jamming signal transmitted at a first frequency, comprising:

coordinating a processing update interval with a hop interval for the jamming signal;

communicating at least one of said hop interval and said processing update interval via a wireless encoded link for coordinating the processing update interval with the hop interval;

transmitting the jamming signal at the first frequency during the hop interval;

receiving the spread spectrum signal;

processing the spread spectrum signal during the processing update interval; and removing the jamming signal from the spread spectrum signal by removing the first frequency during the processing update interval.

2. The method as claimed in claim 1, further comprising:
coordinating the processing update interval with a second hop interval for a second jamming signal;
transmitting the second jamming signal at a second frequency during the second hop interval; and
removing the second jamming signal from the spread spectrum signal by removing the second frequency during the processing update interval.

3. The method as claimed in claim 2, wherein the second hop interval is equal to the first hop interval.

4. The method as claimed in claim 3, wherein the second frequency is different from the first frequency.

5. The method as claimed in claim 4, wherein the processing step incorporates an anti-jam algorithm that works in the frequency domain for removing the jamming signal from the spread spectrum signal, the anti-jam algorithm utilizing at least one of spatial nulling, Space-Time Adaptive Processing (STAP), and Space-Frequency Adaptive Processing (SFAP).

* * * * *